3,812,065
SURFACE-COATING COMPOSITIONS CONTAINING N-(SUBSTITUTED INDAZOLYL-N¹-METHYL) HEXAMETHYLENETETRAAMONIUM HALIDES

Pasquale P. Minieri, Woodside, N.Y., assignor to Tenneco Chemicals, Inc., Saddle Brook, N.J.
No Drawing. Original application Nov. 22, 1971, Ser. No. 201,178, now Patent No. 3,730,954. Divided and this application Nov. 3, 1972, Ser. No. 303,488
The portion of the term of the patent subsequent to Dec. 11, 1990, has been disclaimed
Int. Cl. C09d 3/64, 3/74, 5/14
U.S. Cl. 260—22 R                9 Claims

ABSTRACT OF THE DISCLOSURE

Surface-coating compositions contain as biocide a compound having the structural formula

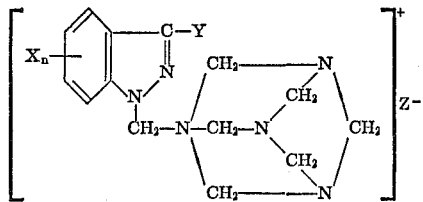

wherein X represents halogen, nitro, amino, acetamino, or (halobenzylidene)amino; Y represents hydrogen or halogen; Z represents halogen; and $n$ represents an integer in the range of zero to 2.

---

This is a division of my copending application Ser. No. 201,178, which was filed on Nov. 22, 1971, which is now U.S. Pat. 3,730,954.

This invention relates to surface-coating compositions. More particularly, it relates to surface-coating compositions containing N-(substituted indazolyl-N¹-methyl)hexamethylenetetraammonium halides that have improved resistance to deterioration resulting from attack by fungi and other organisms.

It is well known in the art that paints and varnishes often have inadequate resistance to the action of microorganisms. Some of these coating compositions, such as enamels and house paints, contain as their resinous binders drying oils, oleoresinous varnishes, or alkyd resins, which are subject to attack by fungi. Others, for example, aqueous dispersions of water-insoluble synthetic linear polymers, generally contain as plasticizers and as thickeners materials that have their origin in animal or vegetable sources and that render the compositions susceptible to mildew. The resulting deterioration of the surface-coating compositions seriously hinders their full-scale utilization, particularly in those areas and in those applications that are conducive to such attack. Various biocidal materials have been suggested for use in surface-coating compositions, but none has proven to be entirely satisfactory in this application. Some do not provide the required prolonged protection against attack by microorganisms, while others undergo sulfide staining, and still others tend to separate from the applied coating by migration, volatilization, or leaching once the coating has been spread in a thin layer over the surface to be protected.

In accordance with this invention, it has been found that surface-coating compositions can be protected from attack by fungi and other microorganisms by incorporating in them a new class of biocides. These biocides, which are thoroughly compatible with the resinous binders that are commonly used in surface-coating compositions and which are resistant to sulfide staining, provide excellent and prolonged resistance to deterioration resulting from attack by fungi, bacteria, and other microorganisms without adversely affecting the viscosity and other physical properties of the surface-coating compositions.

The biocidal compounds that are used in the surface-coating compositions of this invention may be represented by the structural formula

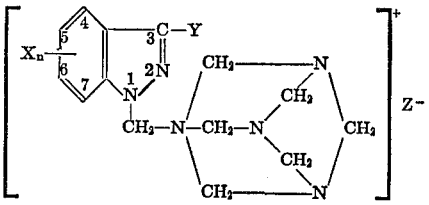

wherein X represents chlorine, bromine, fluorine, iodine, nitro, amino, acetamino, (chlorobenzylidene)amino, or (bromobenzylidene)amino; Y represents hydrogen, chlorine, bromine, fluorine, or iodine; Z represents chlorine, bromine, fluorine, or iodine; and $n$ represents an integer in the range of zero to 2. Illustrative of these compounds are the following:

N-(3-bromoindazolyl-N¹-methyl)hexamethylenetetraammonium bromide,
N-(6-acetaminoindazolyl-N¹-methyl)hexamethylenetetraammonium iodide,
N-[6-(3,4-dichlorobenzylidene)aminoindazolyl-N¹-methyl]hexamethylenetetraammonium chloride,
N-(4-iodoindazolyl-N¹-methyl)hexamethylenetetraammonium iodide,
N-(3,5,6-trichloroindazolyl-N¹-methyl)hexamethylenetetraammonium chloride, and the like.

Particularly effective as biocides for use in surface-coating compositions are the compounds represented by the structural formula

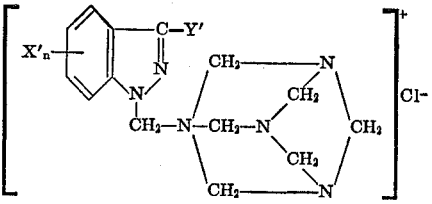

wherein X' represents chlorine or nitro, Y' represent hydrogen or chlorine, and $n$ represents an integer in the range of zero to 2. Examples of these preferred compounds include N-(3-chloroindazolyl-N¹-methyl)hexamethylenetetraammonium chloride,
N-(5-chloroindazolyl-N¹-methyl)hexamethylenetetraammonium chloride,
N-(3,5-dichloroindazolyl-N¹-methyl)hexamethylenetetraammonium chloride
N-(5,7-dichloroindazolyl-N¹-methyl)hexamethylenetetraammonium chloride, and
N-(3,5,7-trichloroindazolyl-N¹-methyl)hexamethylenetetraammonium chloride.

The novel compounds of this invention may be prepared by any suitable and convenient procedure. For example, they may be prepared by heating the appropriate N¹-halomethyl-substituted-indazole with hexamethylenetetramine. The reaction is usually carried out in a solvent, such as chloroform, carbon tetrachloride, or ethylene dichloride, at the reflux temperature of the reaction mixture. The N¹-halomethyl-substituted-indazoles may be prepared by the procedure described in my copending application Ser. No. 589,235, which was filed on Oct. 25, 1966 and which is now U.S. Pat. No. 3,637,736.

The biocidal compounds of this invention can be used to impart fungal and bacterial resistance to a wide variety of surface-coating compositions including both solvent-based and water-based coating systems. They are of particular value as biocides in surface-coating compositions that contain as their resinous binder an organic, water-insoluble, film-forming resin that is a synthetic linear addition polymer or an oleoresinous binder.

In a preferred embodiment of the invtntion the novel quaternary ammonium halides are used as biocides in aqueous dispersions that contain about 10 to 60 percent by weight of a water-insoluble linear addition polymer and/or an oleoresinous binder. The aqueous dispersions of synthetic linear addition polymers are ordinarily prepared by the emulsion polymerization of ethylenically-unsaturated compounds, especially those of monoethylenically-unsaturated character, although butadiene, chlorobutadiene, and isoprene may be used to some extent. Illustrative of the synthetic linear addition polymers that can be used as the resinous binder in the aqueous dispersions are polyvinyl acetate; polyvinyl butyrate; polyvinyl chloride; copolymers of vinyl acetate with acrylonitrile; copolymers of vinyl chloride with vinylidene chloride; polyethylene; polyisobutylene; polystyrene; copolymers of styrene with butadiene; copolymers of acrylonitrile with butadiene; copolymers of methacrylic acid esters of alcohols having 1 to 8 carbon atoms with vinyl acetate, vinyl chloride, acrylonitrile, or styrene; copolymers of acrylic acid esters of alcohols having 1 to 8 carbon atoms with vinyl acetate, vinyl chloride, acrylonitrile, or styrene; copolymers of styrene with maleic anhydride; and mixtures thereof. Suitable oleoresinous binders include drying oils, such as linseed oil, tung oil, soybean oil, dehydrated castor oil, safflower oil, or fish oil, bodied drying oils; blends of drying oils or bodied drying oils with a resin component such as limed rosin, an ester gum, or phenolic resin; oleoresinous varnishes formed by heating one of the aforementioned resins with one or more drying oils or bodied drying oils; alkyd resins, which are resinous products resulting from the reaction of a polyhydric alcohol, such as pentaerythritol or glycerol, with a dicarboxylic acid, such as phthalic anhydride, and fatty acids; and mixtures thereof.

In another preferred embodiment of the invention, the novel compounds are used as the biocide in organic solvent-based systems that contain an oleoresinous binder as hereinbefore defined.

Only a small concentration of the biocidal compound need be present in the surface-coating compositions. As little as 0.10 percent of one or more of these compounds, based on the weight of the composition, will bring about an appreciable improvement in the resistance of the composition to attack by microorganisms. Approximately 5.0% or more of the biocidal compound, based on the weight of the composition, can be used, but these larger amounts generally do not provide further improvement in the properties of the surface-coating compositions and for this reason are not ordinarily used. While the amount of the biocide that will provide optimum protection for the surface-coating compositions depends upon such factors as the choice of biocidal compound, the choice of resinous binder and other components of the composition, the amount of each that is employed, and the application for which the coating composition is intended, in most cases about 0.25 percent to 2.0 percent of the biocidal compound, based on the weight of the surface-coating composition, is used.

In addition to the resinous binder and the quaternary ammonium halide, the surface-coating compositions of this invention may contain various auxiliary materials, such as pigments, extenders, solvents, dyes, defoaming agents, driers, emulsifying agents, dispersing agents, plasticizers, and the like in the amounts ordinarily used for these purposes.

The biocidal compounds may be incorporated into the surface-coating compositions by any convenient procedure. For example, they can be combined with pigments and various other components to form a pigment phase that is then mixed with the resinous binder and water or an organic solvent to form the surface-coating composition. Alternatively, they can be added to a composition that contains the resinous binder, pigment, and water or organic solvent. The biocidal compound can be added as such to the other components of the surface-coating composition, or they can be added as a solution in an alcohol, ether, ketone or other solvent.

The invention is further illustrated by the following examples.

EXAMPLE 1

A mixture of 100 ml. of chloroform, 11.0 grams (0.08 mole) of hexamethylenetetramine, and 16.6 grams (0.08 mole) of N'-chloromethyl-6-nitroindazole was heated at its reflux temperature for 2 hours and then cooled to 5° C. The product was isolated by filtration and then washed with cold coloroform. The combined filtrate and chloroform washings were evaporated to one-third of the original volume and then filtered. The two crops of N-(6-nitroindazolyl-$N^1$ - methyl)hexamethylenetetraammonium chloride were combined and dried at 60° C. under reduced pressure. There was obtained an 83.3 percent yield of N-(6 - nitroindazolyl - $N^1$ - methyl)hexamethylenetetraammonium chloride, which melted at 207°–209° C. and which contained 10.8 percent Cl and 26.3 percent N (calculated, 10.1 percent Cl and 27.7 percent N). The structure of the compound was confirmed by its infrared spectrum.

EXAMPLE 2

A mixture of 150 ml. of carbon tetrachloride, 7.8 grams (0.055 mole) of hexamethylenetetramine, and 13.7 grams (0.056 mole) of $N^1$-chloromethyl-3-chloro-6-nitroindazole was heated at its reflux temperature for 2 hours and then cooled to 5° C. The product was isolated by filtration, washed with 25 ml. of cold carbon tetrachloride, and dried at 60° C. under reduced pressure. There was obtained a 94.8 percent yield of N-(3-chloro-6-nitroindazolyl-$N^1$-methyl)hexamethylenetetraammonium chloride, which melted at 188°–190° C. and which contained 44.1 percent C, 4.73 percent H, 24.3 percent N, and 18.6 percent Cl (calculated, 43.4 percent C, 4.65 percent H, 25.3 percent N, and 18.3 percent Cl). The structure of the compound was confirmed by its infrared spectrum.

EXAMPLES 3–6

A series of N-(substituted indazolyl-$N^1$-methyl)hexamethylenetetraammonium chlorides was prepared by the procedure described in Example 2. The compounds prepared and their properties are given in Table I.

TABLE I

| Ex. No. | Compound | Yield, percent | M.P. (° C.) | Analysis, percent (calculated) |
|---|---|---|---|---|
| 3 | N-(3-chloroindazolyl-$N^1$-methyl)hexamethylenetetraammonium chloride. | 79.5 | 175–186 | |
| 4 | N-(5-chloroindazolyl-$N^1$-methyl)hexamethylenetetraammonium chloride. | 46 | 201–208 | 42.7 C (41.7)<br>5.9 H (5.3)<br>24.6 N (24.6)<br>21.8 Cl (20.8) |
| 5 | N-(3-chloro-5-nitroindazolyl-$N^1$-methyl)hexamethylenetetraammonium chloride. | 81.8 | 194–197 | |
| 6 | N-(5,6-dinitroindazolyl-$N^1$-methyl)hexamethylenetetraammonium chloride. | 91.8 | a 64 | | a Decomposes.

EXAMPLE 7

(A) A polyvinyl acetate emulsion paint was prepared by mixing together the following materials:

| | Parts by weight |
|---|---|
| Water | 280 |
| Potassium pyrophosphate | 3 |
| Calcium metasilicate | 135 |
| Titanium dioxide (rutile) | 220 |
| Aqueous solution of methylcellulose (2%) | 200 |
| Diethyl ether of diethylene glycol | 37 |
| Aqueous dispersion containing 55% by weight of polyvinyl acetate | 350 |

To samples of this paint was added 2 percent by weight of one of the compounds of this invention or a comparative biocide.

(B) An acrylic paint was prepared by mixing together the following materials:

| | Parts by weight |
|---|---|
| Titanium dioxide | 1136.0 |
| Mica (325 mesh waterground) | 136.0 |
| Calcium carbonate | 568.0 |
| Water | 699.0 |
| 2% aqueous solution of sodium salt of maleic anhydride/diisobutylene copolymer (Tamol 731) | 41.0 |
| Alkyl aryl polyether surfactant (Triton CF-10) | 9.0 |
| Antifoam agent (Colloid (581B) | 18.0 |
| Ethylene glycol | 91.0 |
| Hydroxyethyl cellulose (Cellosize QP 4400) | 9.1 |
| Antifoam agent (Colloid 581B) | 91.0 |
| Aqueous dispersion containing 43% by weight of the ammonium salt of a copolymer of 66% by weight of ethyl acrylate, 32.5% by weight of methyl methacrylate, and 1.5% by weight of acrylic acid containing 3% by weight of tert. octylphenoxypolyethoxyethanol | 2486.0 |

To samples of this paint was added 2 percent by weight of either one of the compounds of this invention or a comparative biocide.

(C) The polyvinyl acetate and acrylic paints were evaluated by means of an agar diffusion assay. In this test agar is inoculated with the test organism, the treated paint is placed in a well cut from the agar, and after incubation at 28° C. and 85–95% relative humidity, the activity of the biocide is measured by zones of inhibition. The biocidal compounds tested and the results obtained are given in Table II. In this table:

ZO=Zone of inhibition in millimeters
Tr=Trace zone
- -=Not tested
Bacteria A—Mixed inoculum consisting of *P. aeruginosa* ATCC 10145, *A. aerogenes* ATCC 7256, and three unidentified strains of Bacillus
B—*Bacillus subtilis*
C—*Aerobacter aerogenes*
D—*Pseudomonas aeruginosa*
Fungi E—*Pullularia pullulans*
F—*Penicillium crustosum*
G—*Aspergillus niger*

Each of the other N-(substituted indazolyl-$N^1$-methyl) hexamethylenetetraammonium halides disclosed herein can be used in a similar way to control the growth of microorganisms in surface-coating systems.

The terms and expressions which have been employed are used as terms of description and not of limitation. There is no intention in the use of such terms and expressions of excluding any equivalents of the features shown and described or portions thereof, but it is recognized that various modifications are possible within the scope of the invention claimed.

What is claimed is:

1. A surface-coating composition that comprises (a) a water-insoluble resinous binder selected from the group consisting of oleoresinous binders, synthetic linear addition polymers obtained by the vinyl polymerization of monoethylenically-unsaturated monomers, and mixtures thereof and (b) about 0.10 percent to 5 percent, based on the weight of said composition, of a biocidal compound having the structural formula

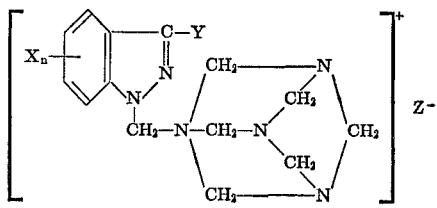

wherein X represents halogen, nitro, amino, acetamino, or (halobenzylidene)amino; Y represents hydrogen or halogen; Z represents halogen; and $n$ represents an integer in the range of zero to 2.

2. A surface-coating composition as set forth in claim 1 wherein the biocidal compound has a structural formula

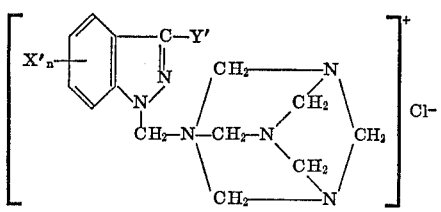

wherein X' represents chlorine or nitro; Y' represents hydrogen or chlorine; and $n$ represents an integer in the range of zero to 2.

3. A surface-coating composition as set forth in claim 2 wherein the biocidal compound is N-(6-nitroindazolyl-$N^1$-methyl)hexamethylenetetraammonium chloride.

4. A surface-coating composition as set forth in claim 2 wherein the biocidal compound is N-(3-chloroindazolyl-$N^1$-methyl)hexamethylenetetraammonium chloride.

5. A surface-coating composition as set forth in claim 2 wherein the biocidal compound is N-(3-chloro-5-nitro-

TABLE II

| | | Effect on paint | | Bacteria | | | | Fungi | | |
|---|---|---|---|---|---|---|---|---|---|---|
| Biocide | Paint | pH | Color | A | B | C | D | E | F | G |
| Product of Example: | | | | | | | | | | |
| 1 | Acrylic | 7.2 | Yellow | ZO-4 | ZO-8 | ZO-2 | Tr | Tr | ZO-1 | Tr |
|   | PVA | 6.3 | Beige | ZO-12 | ZO-11 | ZO-7 | ZO-5 | ZO-6 | ZO-5 | ZO-2 |
| 3 | Acrylic | 8.2 | Off-white | ZO-2 | ZO-5 | Tr | | | | |
|   | PVA | 6.6 | do | ZO-10 | ZO-8 | ZO-5 | ZO-4 | ZO-1 | ZO-2 | Tr |
| 5 | Acrylic | 7.1 | Off-white | ZO-9 | ZO-9 | ZO-5 | ZO-1 | ZO-2 | Tr | ZO-2 |
|   | PVA | 6.4 | do | ZO-12 | ZO-10 | ZO-5 | ZO-6 | ZO-2 | ZO-5 | Tr |
| 6 | Acrylic | 3.8 | Beige | ZO-1 | ZO-1 | | | | | |
|   | PVA | 7.0 | do | ZO-5 | ZO-5 | Tr | Tr | | | |
| Bis(phenylmercury)dodecenyl-succinate (Super Ad-it) | Acrylic | 8.4 | Off-white | ZO-9 | | ZO-6 | ZO-9 | ZO-1 | ZO-10 | |
|   | PVA | 6.9 | do | ZO-10 | ZO-2 | ZO-7 | ZO-17 | ZO-6 | ZO-10 | | indazolyl-N¹-methyl)hexamethylenetetraammonium chloride.

6. A surface-coating composition as set forth in claim 2 wherein the biocidal compound is N-(5,6 - dinitroindazolyl-N¹-methyl)hexamethylenetetraammonium chloride.

7. A surface-coating composition as set forth in claim 1 that contains 0.25 percent to 2.0 percent, based on the weight of said composition, of the biocidal compound.

8. A surface-coating composition as set forth in claim 1 wherein the resinous binder is polyvinyl acetate.

9. A surface-coating composition as set forth in claim 1 wherein the resinous binder is a polymer of esters of acrylic acids.

References Cited

UNITED STATES PATENTS

| | | | |
|---|---|---|---|
| 3,081,221 | 3/1963 | Moyle et al. | 106—15 |
| 3,199,990 | 8/1965 | Taylor | 106—15 |
| 3,574,209 | 4/1971 | Suter et al. | 260—248.5 |
| 3,595,817 | 7/1971 | Deinet | 260—22 |

DONALD E. CZAJA, Primary Examiner

R. A. WHITE, Assistant Examiner

U.S. Cl. X.R.

106—15 AF; 260—29.6 MN, 45.8 NT